United States Patent
Schroeder et al.

(10) Patent No.: US 10,785,456 B1
(45) Date of Patent: Sep. 22, 2020

(54) METHODS FOR VIEWING AND TRACKING STORED ITEMS

(71) Applicant: Haier US Appliance Solutions, Inc., Wilmington, DE (US)

(72) Inventors: Michael Goodman Schroeder, Louisville, KY (US); Choon Jae Ryu, Prospect, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 0 days.

(21) Appl. No.: 16/581,973

(22) Filed: Sep. 25, 2019

(51) Int. Cl.
*H04N 5/232* (2006.01)
*H04N 7/18* (2006.01)
*H04N 5/225* (2006.01)
*G06K 9/00* (2006.01)
*H04L 29/08* (2006.01)

(52) U.S. Cl.
CPC ......... *H04N 7/183* (2013.01); *G06K 9/00624* (2013.01); *H04N 5/2253* (2013.01); *H04N 5/232* (2013.01); *H04L 67/12* (2013.01)

(58) Field of Classification Search
CPC ...... H04N 7/183; H04N 5/2253; H04N 5/232; H04N 5/23222; H04N 5/2252; H04N 7/181; G06K 9/00624; H04L 67/12; E05Y 2900/31; E05F 15/614; F25D 29/005; F25D 29/00; F25D 2400/06; F25D 2400/10; F25D 2400/14
See application file for complete search history.

(56) References Cited

U.S. PATENT DOCUMENTS

| 8,326,071 | B2 | 12/2012 | Murata | |
|---|---|---|---|---|
| 10,089,520 | B2 * | 10/2018 | Motukuri | F25D 27/005 |
| 10,228,287 | B2 | 3/2019 | Shen et al. | |
| 2014/0293060 | A1 * | 10/2014 | Ryu | G06T 11/60 348/159 |
| 2016/0088262 | A1 | 3/2016 | Lee et al. | |

FOREIGN PATENT DOCUMENTS

| CN | 108399599 A | 8/2018 |
|---|---|---|
| JP | 2015068525 A | 4/2015 |
| WO | WO2018142136 A1 | 8/2018 |

OTHER PUBLICATIONS

K. Verma et al, Object identification for inventory management using Convolutional Neural Network, 2 pages, https://ieeexplore.ieee.org/document/8010578.

* cited by examiner

*Primary Examiner* — Thai Q Tran
*Assistant Examiner* — Jose M Mesa
(74) *Attorney, Agent, or Firm* — Dority & Manning, P.A.

(57) ABSTRACT

A method for operating a refrigerator appliance, as provided herein, may include initiating an image capture sequence at a camera module. The image capture sequence may include a first two-dimensional image captured at the camera module and a second two-dimensional image captured at the camera module subsequent to the first two-dimensional image. The method may further include assigning an image score to the first two-dimensional image according to a predetermined grading scale, and assigning an image score to the second two-dimensional image according to the predetermined grading scale. The method may still further include comparing the image scores of the first and second two-dimensional images, and presenting one of the first and second two-dimensional images on a digital display based on comparing the image scores.

18 Claims, 7 Drawing Sheets

METHODS FOR VIEWING AND TRACKING STORED ITEMS

FIELD OF THE INVENTION

The present subject matter relates generally to viewing and tracking items within a storage enclosure, such as a refrigerator appliance.

BACKGROUND OF THE INVENTION

Storage enclosures, such as refrigerator appliances and pantries, generally provide an enclosed chamber for receiving multiple items or objects. For example, refrigerator appliances generally include a cabinet that defines a chilled chamber. A user can place food items or objects within the chilled chamber in order to hinder perishing of such food items. Thereby, a useable life of perishable items or objects can be increased.

Over time, a large volume or number of stored items (e.g., food items) can accumulate within the refrigerator's chilled chamber. As stored items accumulate, users of the refrigerator appliance can have difficulty identifying the items located within the refrigerator appliance. Additionally, users can have difficulty determining a quantity of certain items within the refrigerator appliance. This is especially true when multiple users add/remove items from a common refrigerator appliance without communicating with other users. Consequently, the users may accidentally purchase excessive or undesired items. For example, certain food items do not readily perish within the chilled chamber, and such food items may be consumed infrequently. Thus, such food items can remain within the chilled chamber for extended periods of time. The users can forget about such food items and purchase replacements despite already having acceptable items. In such a manner, the users can be inconvenienced or expend money needlessly. Additionally or alternatively, some users may be unaware that certain items have been removed or consumed. Thus, users may fail to replace or replenish such items.

Accordingly, a refrigerator appliance with features for assisting a user with viewing or tracking contents of a chilled chamber of the refrigerator appliance would be useful. In particular, a refrigerator appliance with features for assisting a user with viewing or tracking contents of a chilled chamber of the refrigerator appliance in order to establish an inventory of stored items positioned within the chilled chamber would be useful.

BRIEF DESCRIPTION OF THE INVENTION

Aspects and advantages of the invention will be set forth in part in the following description, or may be obvious from the description, or may be learned through practice of the invention.

In one exemplary aspect of the present disclosure, a refrigerator appliance is provided. The refrigerator appliance may include a cabinet, a door, a camera module, a digital display, and a controller. The cabinet may define a chilled chamber. The door may be rotatably hinged to the cabinet to provide selective access to the chilled chamber. The camera module may be mounted to the cabinet. The digital display may be in operable communication with the camera module. The controller may be operably coupled to the camera module and the digital display. The controller being configured to initiate an operation routine. The operation routine may include initiating an image capture sequence at the camera module. The image capture sequence may include a first two-dimensional image captured at the camera module and a second two-dimensional image captured at the camera module subsequent to the first two-dimensional image. The operation routine may further include assigning an image score to the first two-dimensional image according to a predetermined grading scale, assigning an image score to the second two-dimensional image according to the predetermined grading scale, comparing the image scores of the first and second two-dimensional images, and presenting one of the first and second two-dimensional images on the digital display based on comparing the image scores.

In another exemplary aspect of the present disclosure, a method of operating a refrigerator appliance is provided. The method may include initiating an image capture sequence at a camera module. The image capture sequence may include a first two-dimensional image captured at the camera module and a second two-dimensional image captured at the camera module subsequent to the first two-dimensional image. The method may further include assigning an image score to the first two-dimensional image according to a predetermined grading scale, and assigning an image score to the second two-dimensional image according to the predetermined grading scale. The method may still further include comparing the image scores of the first and second two-dimensional images, and presenting one of the first and second two-dimensional images on a digital display based on comparing the image scores.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the term "or" is generally intended to be inclusive (i.e., "A or B" is intended to mean "A or B or both"). The terms "first," "second," and "third" may be used interchangeably to distinguish one component from another and are not intended to signify location or importance of the individual components.

Generally, the present disclosure provides methods to aid in managing an inventory for food items within a storage enclosure, such as a refrigerator appliance or pantry. The methods may include one or more steps for automatically (e.g., without direct user input) discerning which image from a series of images provides a superior view of a portion of the storage enclosure, such as within a movable drawer.

Figure 1:
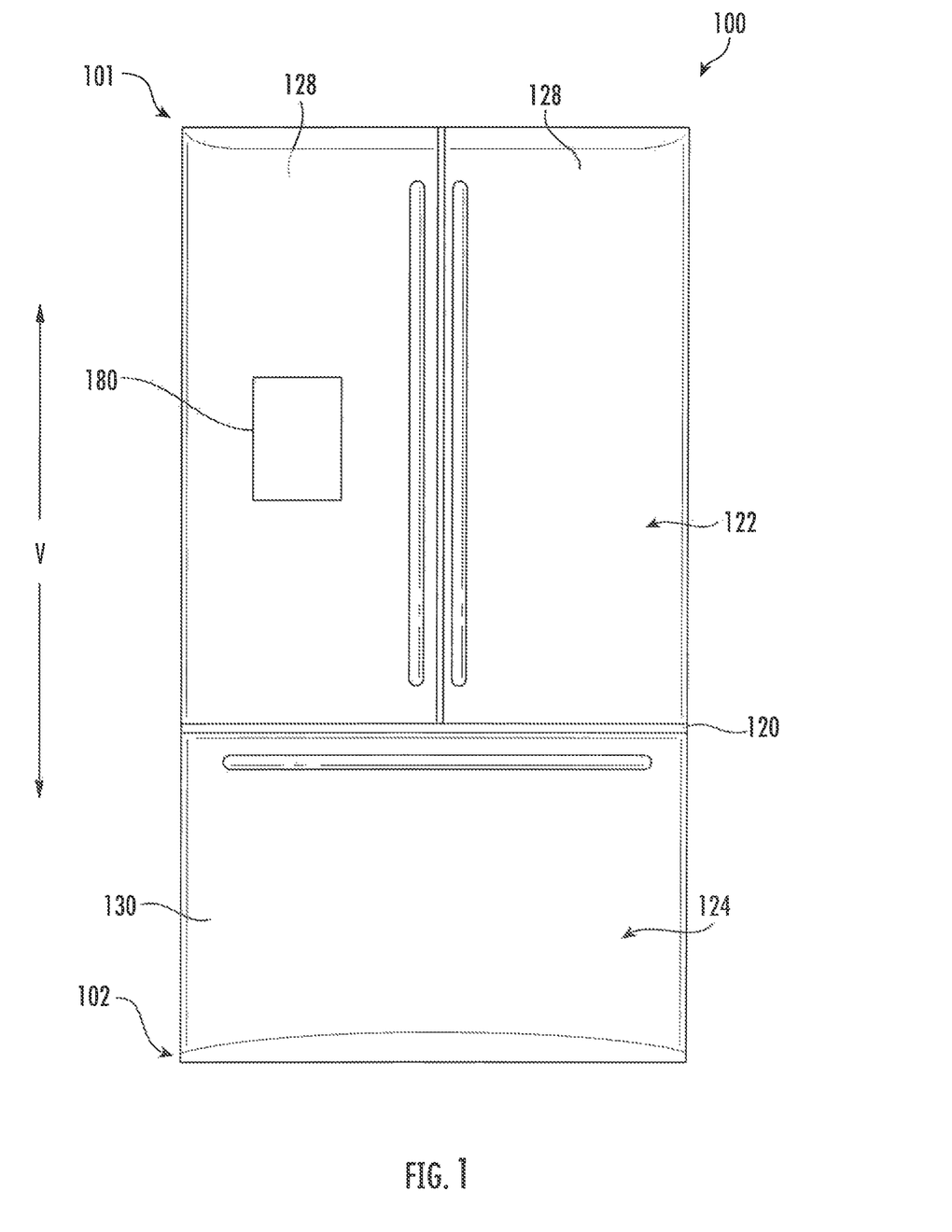
FIG. 1 provides a front elevation view of a refrigerator appliance according to exemplary embodiments of the present disclosure.
Figure 2:
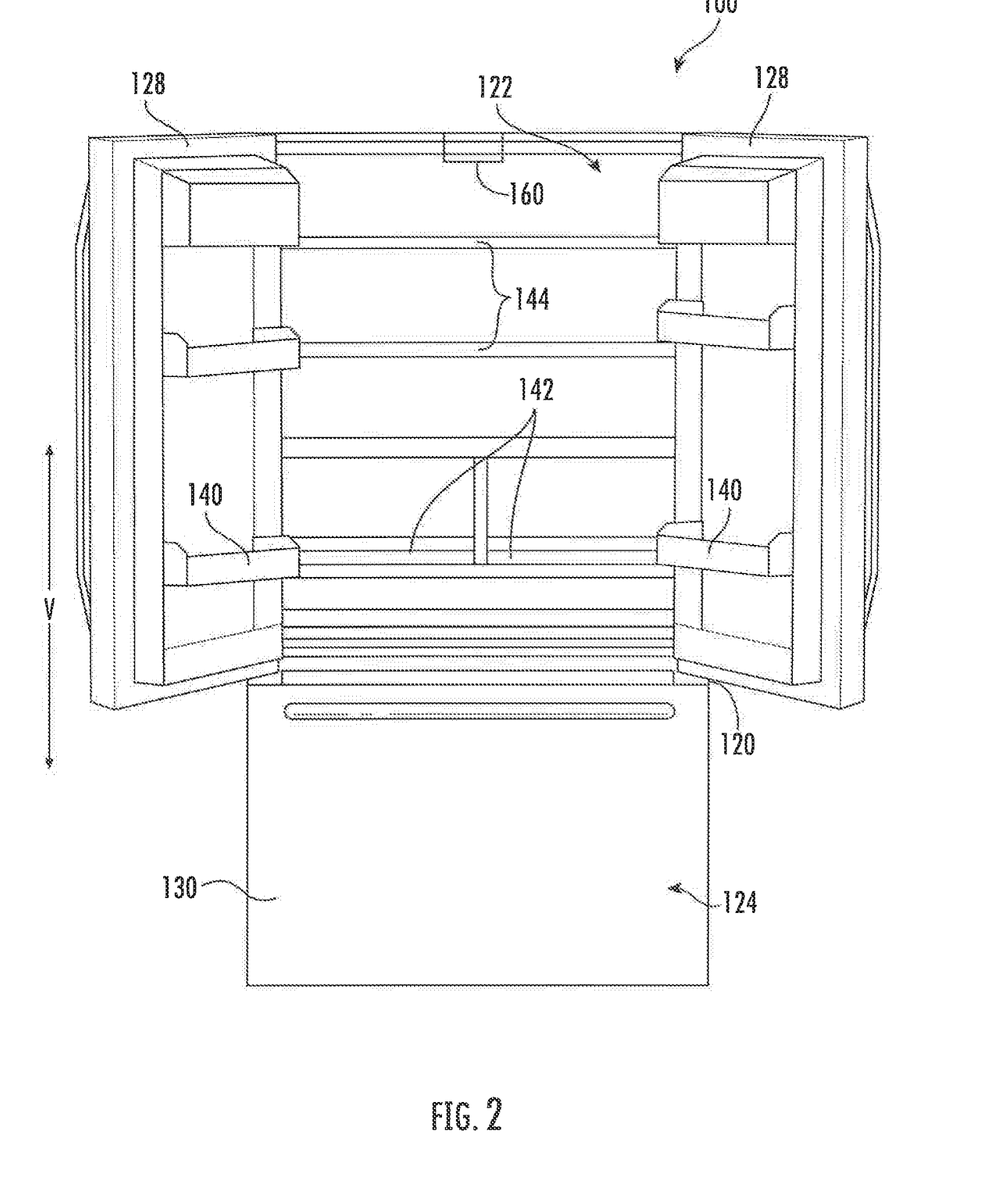
FIG. 2 provides a front elevation view of a refrigerator appliance according to exemplary embodiments of the present disclosure, wherein refrigerator doors are shown in an open position.

Turning now to the figures, FIG. 1 provides a front elevation view of a refrigerator appliance 100 according to exemplary embodiments of the present disclosure with refrigerator doors 128 of the refrigerator appliance 100 shown in a closed position. FIG. 2 provides a front view elevation of refrigerator appliance 100 with refrigerator doors 128 shown in an open position to reveal a fresh food chamber 122 of refrigerator appliance 100.

Refrigerator appliance 100 includes a housing or cabinet 120 that extends between a top 101 and a bottom 102 along a vertical direction V. Cabinet 120 defines chilled chambers for receipt of food items for storage. In particular, cabinet 120 defines fresh food chamber 122 positioned at or adjacent top 101 of cabinet 120 and a freezer chamber 124 arranged at or adjacent bottom 102 of cabinet 120. As such, refrigerator appliance 100 is generally referred to as a bottom mount refrigerator. It is recognized, however, that the benefits of the present disclosure apply to other types and styles of storage enclosure, such as a top mount refrigerator appliance, a side-by-side style refrigerator appliance, or an unrefrigerated pantry enclosure. Consequently, the description set forth herein is for illustrative purposes only and is not intended to be limiting in any aspect to any particular storage enclosure or refrigerator chamber configuration.

Refrigerator doors 128 are rotatably hinged to an edge of cabinet 120 for selectively accessing fresh food chamber 122. In addition, a freezer door 130 is arranged below refrigerator doors 128 for selectively accessing freezer chamber 124. Freezer door 130 is coupled to a freezer drawer 142 (not shown) slidably mounted within freezer chamber 124. As discussed above, refrigerator doors 128 and freezer door 130 are shown in the closed configuration in FIG. 1, and refrigerator doors 128 are shown in the open position in FIG. 2.

Turning now to FIG. 2, various storage components are mounted within fresh food chamber 122 to facilitate storage of food items therein as will be understood by those skilled in the art. In particular, the storage components include bins 140, drawers 142, and shelves 144 that are mounted within fresh food chamber 122. Bins 140, drawers 142, and shelves 144 are configured for receipt of stored items (e.g., beverages or solid food items) and may assist with organizing such food items. As an example, drawers 142 can receive fresh food items (e.g., vegetables, fruits, or cheeses) and increase the useful life of such fresh food items.

Refrigerator appliance 100 also includes features for assisting a user with identifying food items positioned within fresh food chamber 122 or freezer chamber 124. The user can utilize such features, for example, to view food items stored (i.e., stored items) within fresh food chamber 122 or freezer chamber 124 or create an inventory of such stored items. Such features are discussed in greater detail below.

Figure 3:
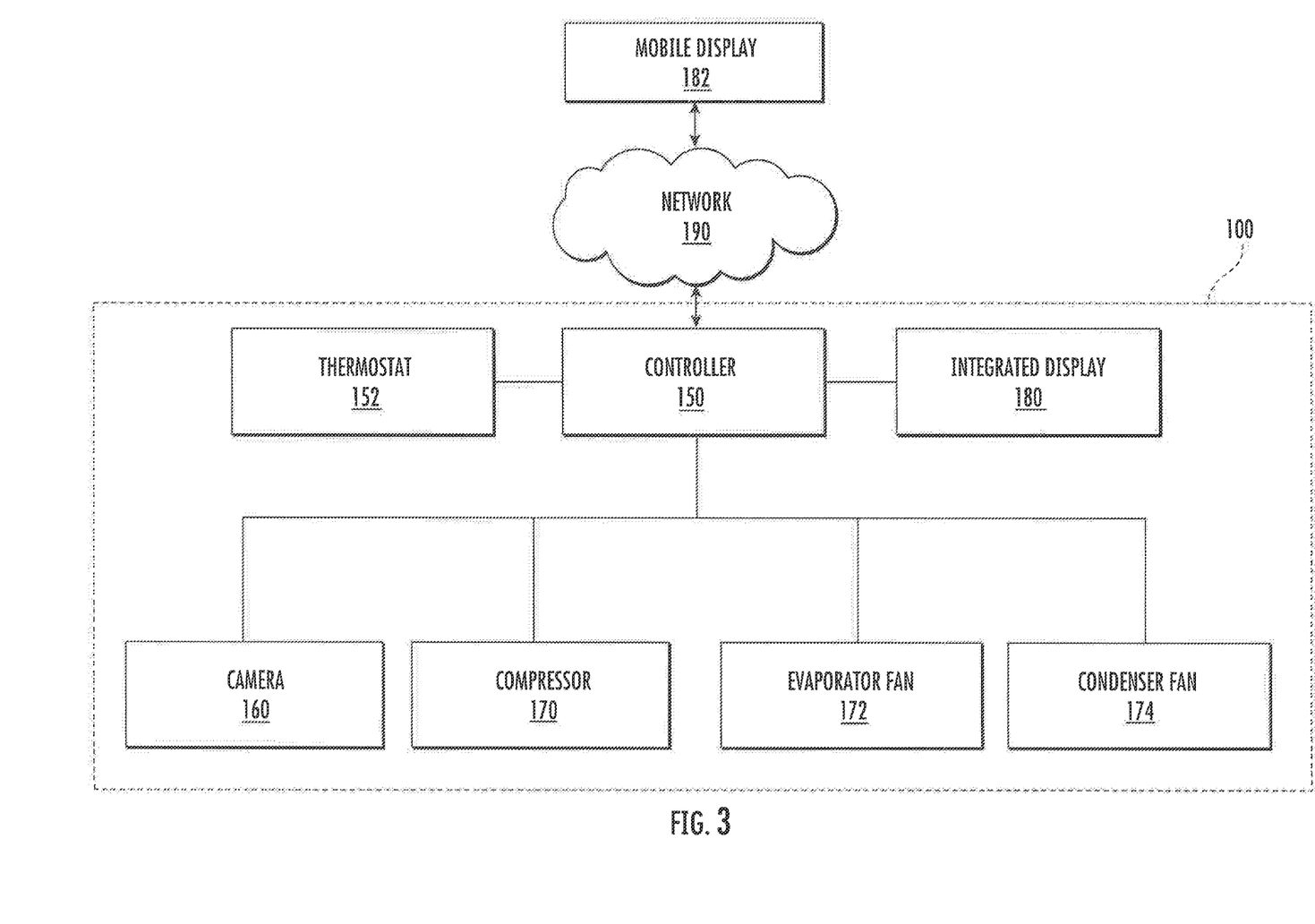
FIG. 3 provides a schematic view of a refrigerator appliance according to exemplary embodiments of the present disclosure.

FIG. 3 provides a schematic view of refrigerator appliance 100. Refrigerator appliance 100 includes a controller 150 that is operatively coupled or in communication with components of a refrigeration system (not shown) of refrigerator appliance 100 configured for cooling fresh food chamber 122 or freezer chamber 124. The components include a compressor 170, an evaporator fan 172, and a condenser fan 174. Controller 150 can selectively operate such components in order to cool fresh food chamber 122 or freezer chamber 124. Controller 150 is also in communication with a thermostat (e.g., a thermocouple or thermistor). The thermostat may be positioned in fresh food compartment 122 or freezer compartment 124 (FIG. 2). Controller 150 may receive a signal from the thermostat that corresponds to a temperature of fresh food compartment 122 or freezer compartment 124. Controller 150 may also include an internal timer for calculating elapsed time periods.

Controller 150 may include a memory and one or more microprocessors, CPUs or the like, such as general or special purpose microprocessors operable to execute programming instructions or micro-control code associated with operation of refrigerator appliance 100. The memory may represent random access memory such as DRAM, or read only memory such as ROM or FLASH. In some embodiments, the processor executes non-transitory programming instructions stored in memory. For certain embodiments, the instructions include a software package configured to operate appliance 100 or execute an operation routine (e.g., the exemplary method 700 described below with reference to FIG. 7). The memory may be a separate component from the processor or may be included onboard within the processor. Alternatively, controller 150 may be constructed without using a microprocessor (e.g., using a combination of discrete analog or digital logic circuitry; such as switches, amplifiers, integrators, comparators, flip-flops, AND gates, and the like) to perform control functionality instead of relying upon software.

Controller 150 may be positioned in a variety of locations throughout refrigerator appliance 100. Input/output ("I/O") signals may be routed between controller 150 and various operational components of refrigerator appliance 100. One or more components of refrigerator appliance 100 may be in operative communication (e.g., electric communication) with controller 150 via one or more conductive signal lines or shared communication busses. Additionally or alternatively, one or more components of refrigerator appliance 100 may be in operative communication (e.g., wireless communication) with controller 150 via one or more wireless signal bands.

Refrigerator appliance 100 also includes a camera or camera module 160. Camera 160 may be any type of device suitable for capturing a two-dimensional picture or image, such the image illustrated in FIG. 4, FIG. 5, FIG. 6A, or FIG. 6B. As an example, camera 160 may be a video camera or a digital camera with an electronic image sensor [e.g., a charge coupled device (CCD) or a CMOS sensor]. When assembled, camera 160 is in communication (e.g., electric or wireless communication) with controller 150 such that controller 150 may receive a signal from camera 160 corresponding to the image captured by camera 160.

Generally, camera 160 is positioned within refrigerator appliance 100 and is directed toward one or more chilled chamber (e.g., fresh food chamber 122-FIG. 2). In some embodiments, camera 160 is mounted within fresh food chamber 122 at a top portion thereof (e.g., adjacent top 101). For instance, camera 160 may be fixed to or directed through a top wall of an internal liner defining fresh food chamber 122. In such embodiments, camera 160 may be directed downward, as illustrated in FIG. 2. When assembled, camera 160 may be directed towards at least a portion of any particular one of or combination of drawers 142 and shelves 144 (FIG. 2). Thus, camera 160 can capture images of one of drawers 142, all of drawers 142, one of shelves 144, all of shelves 144, or any suitable combination thereof.

In certain embodiments, refrigerator appliance 100 includes an integrated display 180. Integrated display 180 may be mounted on refrigerator door 128 (FIG. 1) or at any other suitable location on refrigerator appliance 100. Integrated display 180 is in operative communication with controller 150 such that integrated display 180 may receive a signal from controller 150 corresponding to an image captured by camera 160. Integrated display 180 can receive such signal from controller 150 and present the image to a user visually. Integrated display 180 may include, for example, a liquid crystal display panel (LCD), a plasma display panel (PDP), or any other suitable mechanism for displaying an image (e.g., a projector).

In additional or alternative embodiments, refrigerator appliance 100 includes a network interface (not shown) that couples refrigerator appliance 100 (e.g., controller 150) to a network 190 such that refrigerator appliance 100 can transmit and receive information over network 190. Network 190 can be any wired or wireless network such as a WAN, LAN, or HAN.

In some such embodiments, refrigerator appliance 100 (e.g., controller 150) is in communication with a mobile display 182 via network 190. Mobile display 182 can be any device configured to communicate over network 190 and display images received therefrom. For example, mobile display 182 may be a computer, a smartphone, or a tablet. Mobile display 182 is in communication with controller 150 such that mobile display 182 may receive a signal from controller 150 (via network 190) corresponding to a user interface or an image captured by camera 160. Mobile display 182 can receive such signal from controller 150 and present one or more images to a user visually. Mobile display 182 may include, for example, a liquid crystal display panel (LCD), a plasma display panel (PDP), or any other suitable mechanism for displaying an image (e.g., a projector). Mobile display 182 can also include an interface (e.g., tactile inputs, such as buttons, or a graphical user interface) that allows mobile display 182 to initiate communications with refrigerator appliance 100 over network 190.

During use, such as during an image capture sequence, camera 160 may capture one or more two-dimensional images (e.g., as a video feed or series of sequential static images) that may be transmitted to the controller 150 (e.g., as a data signal), as is generally understood. From the captured images, items (e.g., stored items, such as food, or non-stored items such as a user appendage, a shelf, a movable drawer, etc.) within the field of view (e.g., set field of view) for the camera 160 may be automatically identified by the controller 150. As is understood, recognizing or identifying such items, may be performed by edge matching, divide-and-conquer search, greyscale matching, histograms of receptive field responses, or another suitable routine (e.g., executed at the controller 150 based on one or more captured images from camera 160).

Turning now to FIGS. 4 through 6B, various exemplary two-dimensional images related to drawer storage are illustrated, such as might be captured at camera 160 (FIG. 2), viewed at integrated display 180 (FIG. 3), or viewed at mobile display 182 (FIG. 3). Optionally, camera 160 may be fixedly mounted (e.g., on or within appliance 100). When assembled, camera 160 may have a set field of view (e.g., region of appliance 100 or the surrounding environment that may be captured within a two-dimensional image at camera 160).

Figure 4:
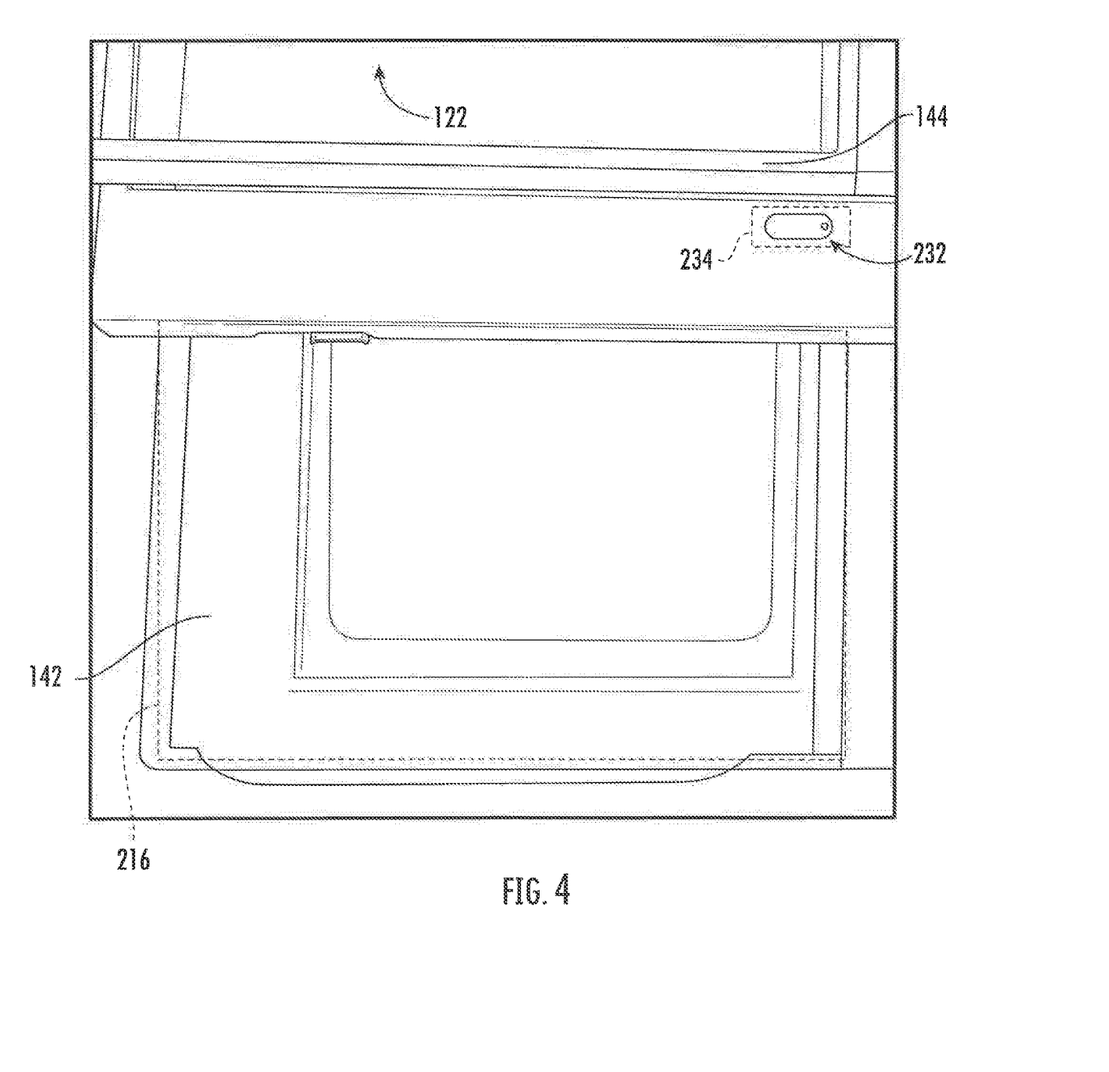
FIG. 4 illustrates an exemplary two-dimensional image of a drawer of a refrigerator appliance captured at a camera assembly of the refrigerator appliance according to exemplary embodiments of the present disclosure.

As an example, FIG. 4 illustrates an exemplary two-dimensional image such as might be captured at camera 160 (FIG. 2) as part of an image capture sequence. In other words, the images at FIG. 4 illustrates a set field of view (or sub-region thereof) for camera 160 directed toward fresh food chamber 122. Once captured (e.g., as part of an image capture sequence), the image at FIG. 4 may be viewed at display 180 or 182. Generally, FIG. 4 provides a view/image in which a drawer 142 is in an opened state, is empty (e.g., does not hold any stored items), and is unobstructed (e.g., free of any obstructing objects 230 blocking the set field of view between the camera 160 and the drawer 142).

Figure 5:
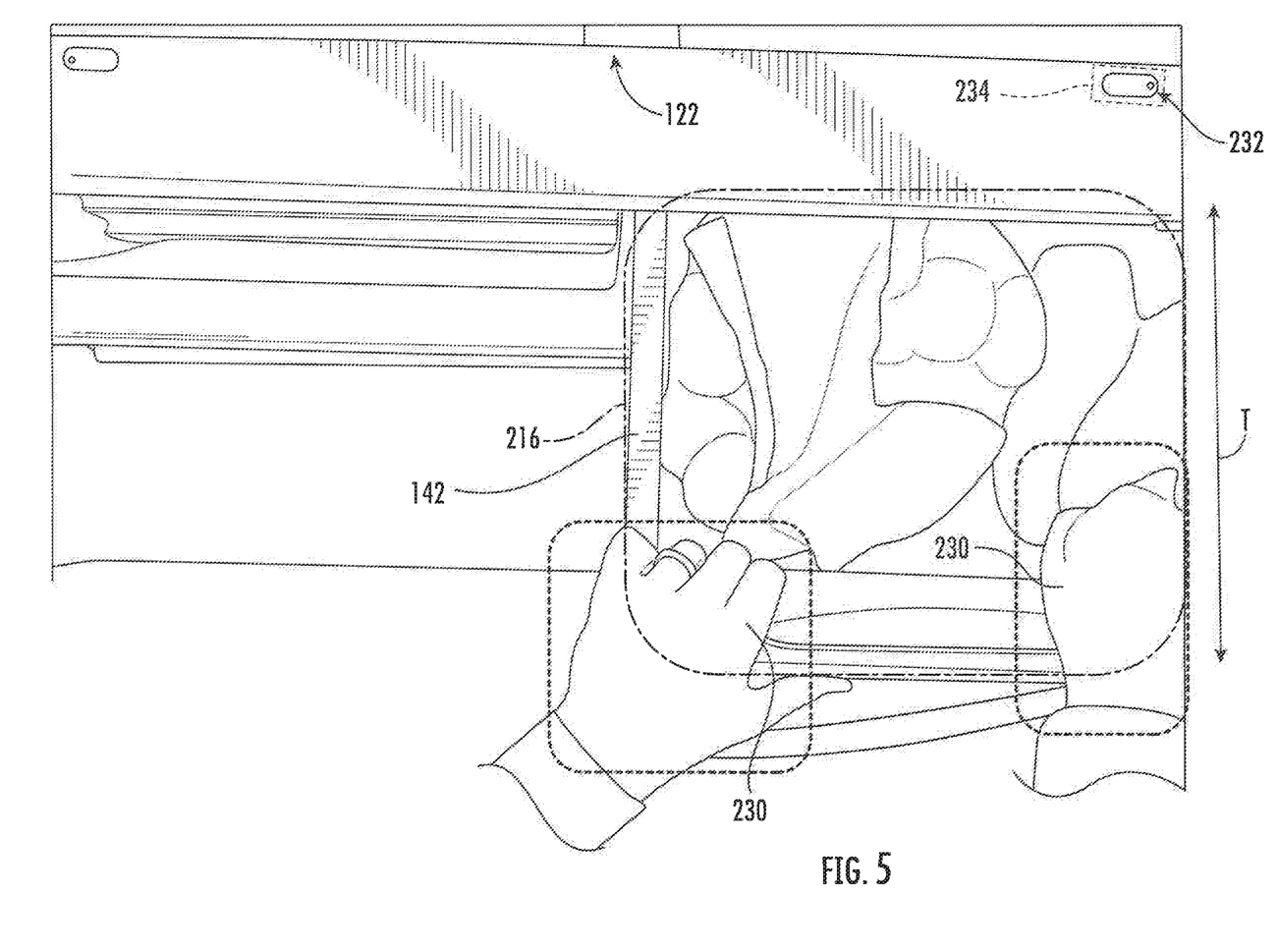
FIG. 5 illustrates an exemplary two-dimensional image of a drawer of a refrigerator appliance captured at a camera assembly of the refrigerator appliance according to exemplary embodiments of the present disclosure.

As an additional or alternative example, FIG. 5 illustrates another exemplary two-dimensional image such as might be captured at camera 160 as part of an image capture sequence. In other words, the image at FIG. 5 illustrates a set field of view (or sub-region thereof) for camera 160 (FIG. 2) directed toward fresh food chamber 122. Once captured (e.g., as part of an image capture sequence), the image at FIG. 5 may be viewed at display 180 or 182. Generally, FIG. 5 provides a view/image in which a drawer 142 is in an opened state, contains one or more stored items, and is partially covered by one or more identified obstructing objects 230.

Figure 6A:
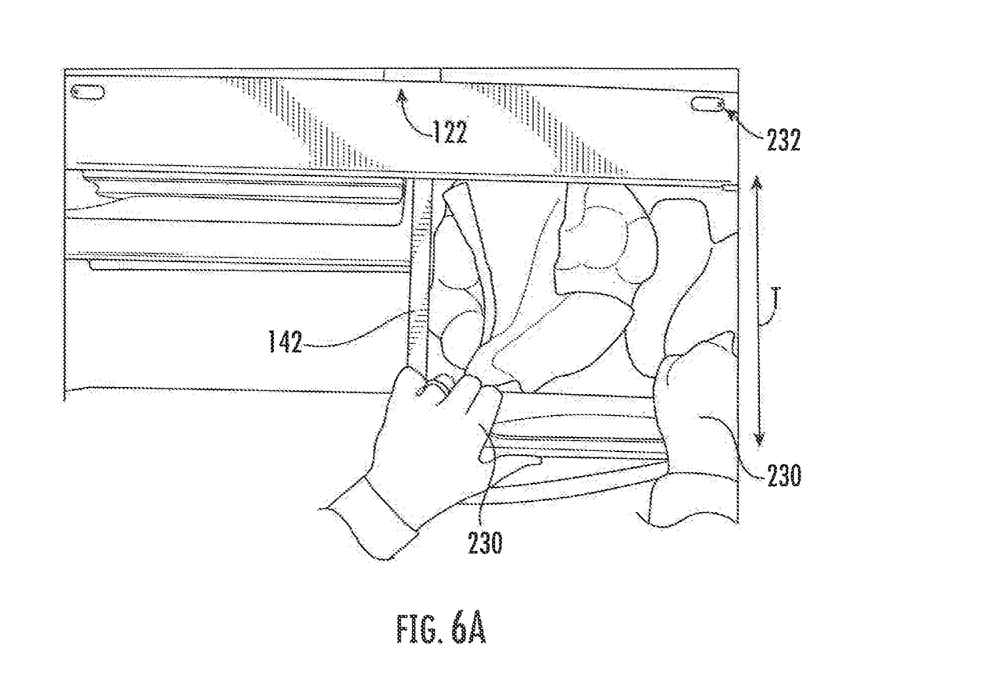
FIG. 6A illustrates a first two-dimensional image in a series of a stored item in a drawer of a refrigerator appliance according to exemplary embodiments of the present disclosure.
Figure 6B:
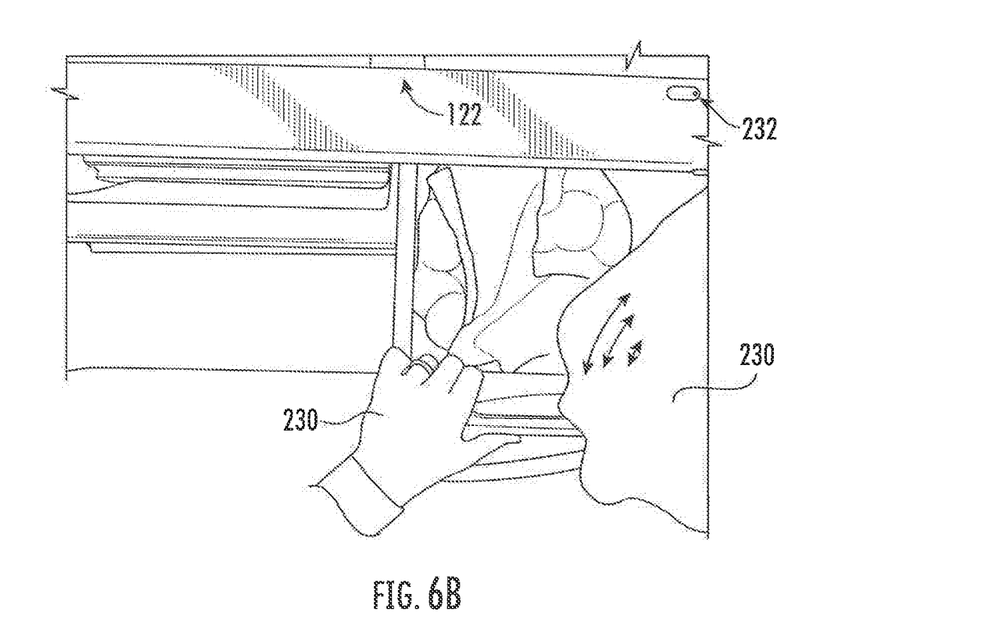
FIG. 6B illustrates a second two-dimensional image in a series of a stored item in a drawer of a refrigerator appliance according to exemplary embodiments of the present disclosure.

As another additional or alternative example, FIGS. 6A and 6B illustrate series of exemplary two-dimensional images such as might be captured at camera 160 (FIG. 2) as part of an image capture sequence. In other words, the images of 6A and 6B each illustrate a set field of view (or sub-region thereof) for camera 160 directed toward fresh food chamber 122 in a first image (FIG. 6A) and second image (FIG. 6B). Once captured (e.g., as part of an image capture sequence), the image of 6A or 6B may be viewed at display 180 or 182 (e.g., after being selected at controller 150). Generally, FIG. 6A provides a view/image in which a drawer 142 is in an opened state and a relatively low blur is detected in a predetermined sub-region 216. FIG. 6B provides a view/image in which a drawer 142 is in an opened state and a relatively high blur (of an obstructing object 230) is detected in a predetermined sub-region 216 obstructing objects 230.

In certain embodiments, camera 160 and controller 150 are configured to capture multiple, sequential, two-dimensional images (e.g., at a predetermined rate or pattern) as part of an image capture sequence. Sequential images (e.g., a previously-captured image and a more-recently-captured image) may be recorded (e.g., temporarily) and compared at the controller 150. From the comparison, changes or differences between sequential images may be detected. Additionally or alternatively, multiple images may be scored and compared at the controller 150. For example, multiple discrete images may be assigned image or recognition scores to determine how well (e.g., comparatively) certain portions of the appliance 100 (and stored items therein) can be viewed or recognized.

In some embodiments, the image capture sequence is prompted or initiated in response to detected movement within, or forward from, a chilled chamber (e.g., fresh food chamber 122). The image capture sequence may subsequently be stopped or halted according to one or more end conditions, such as expiration of a predetermined time period, failure to detect further changes in sequential images, or closing of the door 128.

In certain embodiments, controller 150 is configured to evaluate the quality or characteristics of two-dimensional images from camera 160. As an example, controller 150 may be configured to identify an opened state of at least one drawer 142 within fresh food chamber 122 based on signals or images received from the camera 160 (e.g., during or prior to an image capture sequence). For instance, from the two-dimensional images captured from the camera 160, the controller 150 may identify the drawer 142 has been positioned within a predetermined sub-region (e.g., bounding zone 216) of the set field of view of camera 160. Generally, each two-dimensional image includes multiple pixels (e.g., arranged in a predefined grid), as is understood. In some embodiments, the predetermined bounding zone 216 establishes a two-dimensional grid or sub-region of pixels that is fixed relative to fresh food chamber 122 (e.g., forward therefrom). In additional or alternative embodiments, the opened state may be measured as a relative value of openness. Controller 150 may, for instance, identify how many pixels (Ptd) along the transverse direction T are occupied by drawer 142 relative to the total number of pixels along the transverse direction T that included in the bounding zone 216 (Ptz). The relative value of openness may be then calculated as (Ptd/Ptz).

Optionally, a corresponding predetermined bounding zone 216 may be identified for each drawer 142. Generally, the predetermined bounding zone 216 may establish a corresponding drawer 142 is no longer closed and is at least partially open to permit insertion or removal of stored items. As an example, in the illustrated image of FIG. 4, drawer 142 is received within the predetermined bounding zone 216. Thus, it may be determined that the drawer 142 is open or otherwise in an opened state such that items may pass to/from the storage area of drawer 142.

As an additional or alternative example, controller 150 may be configured to measure the brightness of a two-dimensional image from camera 160. Generally, each two-dimensional image includes multiple pixels (e.g., arranged in a predefined grid), as is understood. In some embodiments, each pixel within a two-dimensional image or set field of view has a brightness range. Optionally, the brightness range may be an RGB brightness range between, for example, 0 and 255 (e.g., wherein "0" is a minimum RGB pixel-brightness value and "255" is a maximum RGB pixel-brightness value). In certain embodiments, the brightness value for multiple pixels may be detected for a measurement of brightness. For instance, a mean brightness (Bm) value of the pixel-brightness values may be calculated for a corresponding two-dimensional image (or sub-region thereof). Additionally or alternatively, a deviation value may be calculated (e.g., as the brightness value) for multiple pixels in comparison to a balanced value. For instance, the brightness value (Vbr) may be calculated as the absolute value of the mean brightness value minus a balanced vale (e.g., 125) over the balanced value. In other words, in some embodiments, brightness value may be expressed as $$Vbr=(|Bm-125|)/125.$$

As another additional or alternative example, controller 150 may be configured to measure the blur of, or within, a two-dimensional image from camera 160. As noted above, each two-dimensional image includes multiple pixels (e.g., arranged in a predefined grid). In some embodiments, contrast between neighboring pixels may be calculated. For instance, variance in an array may be calculated according to the Laplacian gradient function, as is understood. A blur value (Vbl) may thus be calculated for a corresponding two-dimensional image (or a predetermined sub-region thereof). Relatively blurry images may, for instance, have a Laplacian function value (Bl) between 0 and 75. Relatively clear (i.e., low blur) may, for instance, have include blur value calculated by a Laplacian function value (Bl) between 250 and 1000. Normalized, the blur value (Vbl) may be calculated as the Laplacian function value (Bl) over a maximum Laplacian value (e.g., 1000). In other words, in some embodiments, the blur value may be expressed as $$Vbl=Bl/1000.$$

As yet another additional or alternative example, controller 150 may be configured to identify one or more obstructing objects within a two-dimensional image. Generally, such obstructing objects 230 may be non-stored items (e.g., hands, arms, etc.) that cover or block the set field of view (or a sub-region thereof) of camera 160. For instance, from one or more two-dimensional images captured from the camera 160, the controller 150 may identify one or more obstructing objects 230 covering at least a portion of drawer 142 (e.g., within the bounding zone 216). Generally, controller 150 may be configured to initiate or execute an object-recognition sequence or algorithm to identify certain objects, as is understood (e.g., by edge matching, divide-and-conquer search, greyscale matching, histograms of receptive field responses, or another suitable routine). Once one or more obstructing objects 230 are identified, a covered area may be determined. In other words, the area of the set field of view (or sub-region thereof) being evaluated that includes the obstructing object(s) 230 may be measured or calculated. In additional or alternative embodiments, any obstructions may be measured an obstruction value. Controller 150 may, for instance, identify the partial area of pixels (Ao) within the two-dimensional image (or sub-region thereof) that is occupied by obstructing objects 230 relative to the total area of pixels (At) within the two-dimensional image (or sub-region thereof) that include the bounding zone 216. The obstruction value (Vob) may, in some embodiments, be expressed as $$Vob=(Ao/At).$$

Evaluations by controller 150 of two-dimensional images may be based on the entirety of each image or, alternatively, a sub-region thereof. For instance, one or more evaluations may be limited to the bounding zone 216. One or more other evaluations may be limited to a smaller sub-portion of bounding zone 216.

In some embodiments, multiple evaluations for a two-dimensional image are considered together as an image or recognition score. Multiple evaluation values may be combined into a single recognition score. For instance, a single recognition score may be calculated along a predetermined scale for, and assigned to, a corresponding two-dimensional image based on the openness value, brightness value, blur value, or obstruction value. In some such embodiments, the evaluation values may be normalized to values between −1 and 1. Optionally, in the recognition score, one or more evaluation values may be weighted more than others. For instance, discrete weighted constants between may be applied to each evaluation value. In some embodiments, the openness value or blur value may be weighted by a constant that is relatively large compared to one or more constants of the other evaluation values in the recognition score. As an illustrative example, the recognition score (RS) may be calculated according to a predetermined grading scale expressed as $$RS=(4*Vop)+(1*Vbl)+(-0.5*Vob)+(-0.5*Vbr);$$

wherein $Vop$ is the openness value;
wherein $Vbl$ is the blur value;
wherein $Vob$ is the obstruction value;
wherein $Vbr$ is the brightness value; and
wherein 4, 1, and −0.5 are weighted constants.

If recognition scores are calculated for multiple discrete two-dimensional images, controller 150 may compare the multiple discrete recognition scores and select one two-dimensional image (e.g., the two-dimensional image having the highest recognition score). Optionally, the selected two-dimensional image may be projected on one or more digital display, such as integrated display 180 or mobile display 182. Additionally or alternatively, the selected two-dimensional image may be used for subsequent evaluation (e.g., to identify one or more stored items shown in the selected two-dimensional image).

In exemplary embodiments, controller 150 is configured to identify one or more stored items (e.g., from a selected image). For instance, from the two-dimensional images captured from the camera 160, the controller 150 may identify one or more stored items being added to or removed from drawer 142 (e.g., as such stored items pass to/from the predetermined bounding zone 216). Generally, controller 150 may be configured to initiate or execute an object-recognition sequence or algorithm to identify certain objects, as is understood. Optionally, controller 150 may recognize one or more stored items based on a sub-portion (i.e., less than the entirety) of the two-dimensional profile of the corresponding object. Thus, the controller 150 may calibrate portions of captured two-dimensional images to infer portions of one or more stored items that are hidden, blurred, or otherwise not visible in a captured image.

In additional or alternative embodiments, controller 150 is configured to identify one or more settings within fresh food chamber 122 (e.g., during an image capture sequence). For instance, from the two-dimensional images captured from the camera 160, the controller 150 may identify a control port or slider 232 that moves along a set path to adjust a condition or setting of the appliance 100, such as the relative humidity of a drawer 142. As shown, the control port or slider is generally within the set field of view of camera 160. In some such embodiments, the control port or slider 232 may be mounted at a fixed location within the set field of view of the camera. Thus, a selected slider sub-region 234 of a relatively low number of pixels (e.g., compared to the total number of pixels within a captured two-dimensional image) may be predetermined and used for identifying the control port or slider 232. Once identified, the controller 150 may further determine a setting (e.g., relative position along the corresponding set path), such as through one or more neural network, edge detection, color zone detection, or another suitable recognition sequence, as would be understood.

Optionally, controller 150 may further be configured to compare the determined setting with a predetermined preferred setting for one or more stored items identified within, for example, the drawer 142. If the determined setting does not match the predetermined preferred setting, the controller 150 may generate an alert message (e.g., visual or audible message) presented at, for instance, the integrated display 180 or mobile display 182 indicating the incorrect setting, recommending a correct setting, describing the potential negative effects of the incorrect setting, etc.

Figure 7:
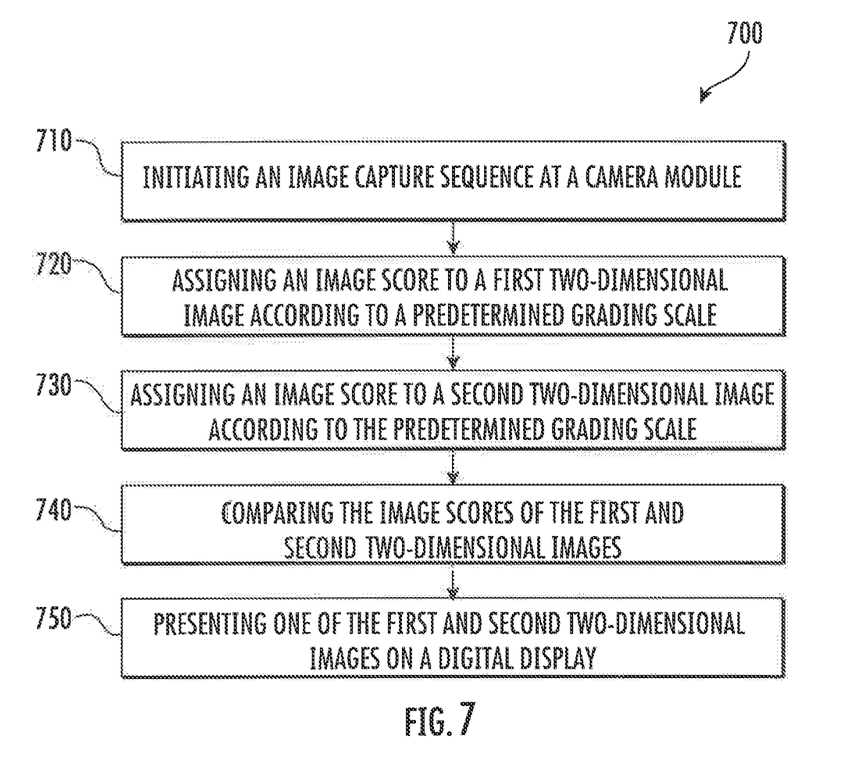
FIG. 7 provides a flow chart illustrating a method of operating a refrigerator appliance according to exemplary embodiments of the present disclosure.

Turning now to FIG. 7, a flow chart is provided of a method 700 according to exemplary embodiments of the present disclosure. Generally, the method 700 provides a method of operating a refrigerator appliance 100 (FIG. 1) that includes a camera 160 and digital display (e.g., integrated display 180 or, as described above. The method 700 can be performed, for instance, by the controller 150 (FIG. 3). For example, controller 150 may, as discussed, be in communication with camera 160, integrated display 180 (FIG. 3), or mobile display 182 (FIG. 3). During operations, controller 150 may send signals to and receive signals from camera 160, integrated display 180, or mobile display 182. Controller 150 may further be in communication with other suitable components of the appliance 100 to facilitate operation of the appliance 100 generally.

Advantageously, methods in accordance with the present disclosure may permit an efficient processing of multiple two-dimensional images to determine, without user input, which two-dimensional image is of the highest quality and suitable, for instance, for viewing by a user or system seeking to determine the contents of a portion of a fresh food chamber or drawer (e.g., when the doors of the refrigerator appliance are closed).

FIG. 7 depicts steps performed in a particular order for purpose of illustration and discussion. Those of ordinary skill in the art, using the disclosures provided herein, will understand that the steps of any of the methods disclosed herein can be modified, adapted, rearranged, omitted, or expanded in various ways without deviating from the scope of the present disclosure (except as otherwise described).

At 710, the method 700 includes initiating an image capture sequence at the camera module. The image capture sequence may include capturing a plurality of two-dimensional images (e.g., a first two-dimensional image, subsequent second two-dimensional image, etc.), such as within a video feed or a series of sequential static images (e.g., taken or captured according to a predetermined rate or condition). Upon being captured at the camera module, the two-dimensional images may be transmitted to the controller (e.g., as a data signal). The two-dimensional images may then be recorded (e.g., temporarily) for comparison or evaluation.

In certain embodiments, the image capture sequence is initiated in response to detecting movement within a chilled chamber (e.g., fresh food chamber) of the refrigerator appliance. Thus, recording or evaluating two-dimensional images from the camera module may be prevented until movement is detected. As an example, movement may be detected at the camera module directed at the chilled chamber. Specifically, changes in light or pixels captured by the camera module may be detected (e.g., between multiple images captured over time) indicating the movement of one or more objects within the field of view of the camera module, as is generally understood. As another example, movement may be detected in response to receiving a signal from a separate sensor, such as a switch selectively engaged with the door. Such switches are generally understood and may, for instance, simultaneously control activation of a light for illuminating the chilled chamber. Opening the refrigerator door may thus activate the light and transmit a signal indicating motion within the chilled chamber.

Optionally, the image capture sequence may continue until one or more end conditions are met. As an example, an end condition may include expiration of a predetermined time period (e.g., span of time) following the start of a corresponding detection of movement. As another example, an end condition may include failure to detect further changes in sequential images of the image capture sequence. In other words, the image capture sequence may end after sequential images stop changing or detecting further movement. The end condition may specifically require a preset number or time period of unchanged sequential images. As yet another example, an end condition may include detecting closure of the door to the chilled chamber. In other words, the image capture sequence may end in response to the door being moved to the closed position.

As described above, an opened state of a drawer within the refrigerator may be identified. Thus, the method 700 may include identifying an opened state of the drawer. Specifically, the identification may be based on one or more two-dimensional images from the camera module (e.g., captured during the first image capture sequence). Optionally, and as also described above, the opened state may be based on a determined openness value.

At 720, the method 700 includes assigning an image score to the first two-dimensional image according to a predetermined grading scale. Assignment of the image score of the first two-dimensional image may be performed during the image capture sequence of 710 or, alternatively, subsequent to the image capture sequence of 710 (e.g., but prior to any other/later image capture sequence).

At 730, the method 700 includes assigning an image score to the second two-dimensional image according to a predetermined grading scale. Assignment of the image score of the second two-dimensional image may be performed during the image capture sequence of 710 or, alternatively, subsequent to the image capture sequence of 710 (e.g., but prior to any other/later image capture sequence).

As described above, the predetermined grading scale may include one or more considered evaluation values. Thus, the image score (e.g., of the first two-dimensional image or the second two-dimensional image) may thus be based on one or more evaluation values. As an example, an image score may be based on an identified opened state (e.g., openness value) of the drawer within a corresponding two-dimensional image. As another example, an image score may be based on pixel brightness (e.g., brightness value) within a corresponding two-dimensional image. As still another example, an image score may be based on image blur (e.g., blur value) within a corresponding two-dimensional image. As yet another example, an image score may be based on recognized obstructions (e.g., obstruction value) within a corresponding two-dimensional image.

In optional embodiments, the assignment of an image score (e.g., of the first two-dimensional image or the second two-dimensional image) is limited to a predetermined sub-region of the set field of view of the camera. In other words, the evaluations made to assign the image score may be based on only pixels within the predetermined sub-region, advantageously limiting required processing (e.g., at the controller).

At 740, the method 700 includes comparing the image scores of the first and second two-dimensional images. For instance, the comparison may include determining an image having a higher score between the first and second two-dimensional images. Thus, 740 may generally provide for identifying which of the first two-dimensional image and the second two-dimensional image is of a higher quality.

At 750, the method 700 includes presenting one of the first and second two-dimensional images on the digital display based on comparing the image scores. For instance, one of the first and second two-dimensional images may be presented if it has the higher score. In other words, the two-dimensional image with the highest score may be presented at the digital display. Advantageously, a user may have a clear, easily-discernable view of the contents within drawer.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A refrigerator appliance comprising:
    a cabinet defining a chilled chamber;
    a door being rotatably hinged to the cabinet to provide selective access to the chilled chamber;
    a camera module mounted to the cabinet;
    a digital display in operable communication with the camera module; and
    a controller operably coupled to the camera module and the digital display, the controller being configured to initiate an operation routine comprising
        initiating an image capture sequence at the camera module, the image capture sequence comprising a first two-dimensional image captured at the camera module and a second two-dimensional image captured at the camera module subsequent to the first two-dimensional image,
        assigning an image score to the first two-dimensional image according to a predetermined grading scale,
        assigning an image score to the second two-dimensional image according to the predetermined grading scale,
        comparing the image scores of the first and second two-dimensional images, and
        presenting one of the first and second two-dimensional images on the digital display based on comparing the image scores.

2. The refrigerator appliance of claim 1, wherein comparing the image scores of the first and second two-dimensional images comprises determining an image having a higher score between the first and second two-dimensional images, and wherein presenting one of the first and second two-dimensional images on the digital display comprises presenting the determined image having the higher score.

3. The refrigerator appliance of claim 1, further comprising a drawer slidably mounted within the chilled chamber, wherein the operation routine further comprises identifying an opened state of the drawer based on one or more two-dimensional images from the camera module.

4. The refrigerator appliance of claim 3, wherein the image score of the first two-dimensional image is based on identifying the opened state.

5. The refrigerator appliance of claim 1, wherein the image score of the first two-dimensional image is based on pixel brightness within the first two-dimensional image.

6. The refrigerator appliance of claim 1, wherein the image score of the first two-dimensional image is based on image blur within the first two-dimensional image.

7. The refrigerator appliance of claim 1, wherein the image score of the first two-dimensional image is based on recognized obstructions within the first two-dimensional image.

8. The refrigerator appliance of claim 1, wherein the image capture sequence captures a set field of view of the camera module, wherein the first and second two-dimensional images are bounded by the set field of view, and wherein assigning the image score to the first two-dimensional image is limited to a predetermined sub-region of the set field of view.

9. The refrigerator appliance of claim 8, wherein assigning the image score to the second two-dimensional image is limited to the predetermined sub-region of the set field of view.

10. A method of operating a refrigerator appliance comprising a camera module mounted within a cabinet at a top portion of a chilled chamber and a digital display in operable communication with the camera module, the method comprising:
  initiating an image capture sequence at the camera module, the image capture sequence comprising a first two-dimensional image captured at the camera module and a second two-dimensional image captured at the camera module subsequent to the first two-dimensional image;
  assigning an image score to the first two-dimensional image according to a predetermined grading scale;
  assigning an image score to the second two-dimensional image according to the predetermined grading scale;
  comparing the image scores of the first and second two-dimensional images; and
  presenting one of the first and second two-dimensional images on the digital display based on comparing the image scores.

11. The method of claim 10, wherein comparing the image scores of the first and second two-dimensional images comprises determining an image having a higher score between the first and second two-dimensional images, and wherein presenting one of the first and second two-dimensional images on the digital display comprises presenting the determined image having the higher score.

12. The method of claim 10, further comprising identifying an opened state of a drawer based on one or more two-dimensional images from the camera module.

13. The method of claim 12, wherein the image score of the first two-dimensional image is based on identifying the opened state.

14. The method of claim 10, wherein the image score of the first two-dimensional image is based on pixel brightness within the first two-dimensional image.

15. The method of claim 10, wherein the image score of the first two-dimensional image is based on image blur within the first two-dimensional image.

16. The method of claim 10, wherein the image score of the first two-dimensional image is based on recognized obstructions within the first two-dimensional image.

17. The method of claim 10, wherein the image capture sequence captures a set field of view of the camera module, wherein the first and second two-dimensional images are bounded by the set field of view, and wherein assigning the image score to the first two-dimensional image is limited to a predetermined sub-region of the set field of view.

18. The method of claim 17, wherein assigning the image score to the second two-dimensional image is limited to the predetermined sub-region of the set field of view.

* * * * *